United States Patent [19]

Van Cauwenberghe et al.

[11] Patent Number: 4,631,958

[45] Date of Patent: Dec. 30, 1986

[54] FORCE-BALANCE DRAG ANEMOMETER

[75] Inventors: Roger Van Cauwenberghe; Jiri Motycka, both of Toronto, Canada

[73] Assignee: Canadian Patents and Development Limited, Ottawa, Canada

[21] Appl. No.: 591,180

[22] Filed: Mar. 19, 1984

[30] Foreign Application Priority Data

Apr. 15, 1983 [CA] Canada ................................ 425,988

[51] Int. Cl.$^4$ .......................... G01P 5/02; G01L 1/08
[52] U.S. Cl. .................................. 73/189; 73/862.61
[58] Field of Search ............... 73/170 A, 189, 517 B, 73/861.71, 861.73, 861.74, 861.75, 862.61, 186, 189

[56] References Cited

U.S. PATENT DOCUMENTS 3,077,783  2/1963  Stiles et al. ....................... 73/517 B

FOREIGN PATENT DOCUMENTS 1408139  10/1975  United Kingdom ................... 73/189
2052047  1/1981  United Kingdom ................. 73/517 B

OTHER PUBLICATIONS

Dessuveault et al., "The Design of a Thrust Anemometer for Drifting Buoy", Ocean 81 Conference Record (IEEE), Sep. 1981, pp. 411-414.

Primary Examiner—Charles A. Ruehl
Attorney, Agent, or Firm—R. G. Hendry

[57] ABSTRACT

The anemometer is for use in measuring two orthogonal velocity components of a fluid, such as air or water. When used to measure wind speed, the wind force acting on a sphere attached to a shaft tends to deflect the shaft from the neutral position. This deflection is measured by optical or electromagnetic sensors which control an electromagnetic actuator which generates a force opposing the wind force thereby returning the shaft to the neutral position. The actuator generates a force proportional to the square of the current applied to the actuator coils. Since the drag force is proportional to the fluid velocity squared (for one dimensional measurement), the wind speed measurement derived from the current applied to the electromagnet will be partly linearized. A microprocessor is used to compute the wind speed components or the wind speed and its direction from the electromagnet signals.

6 Claims, 6 Drawing Figures

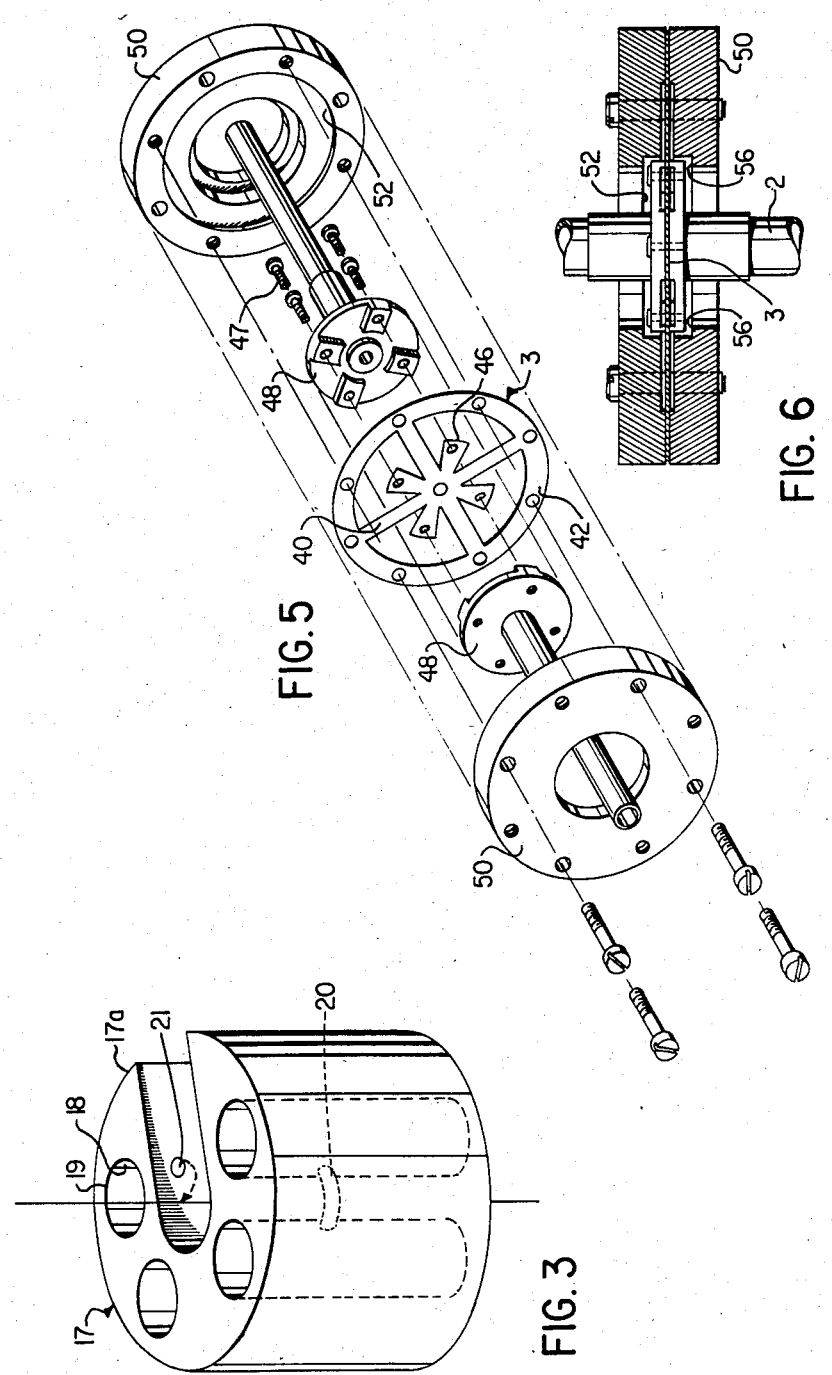

FORCE-BALANCE DRAG ANEMOMETER

BACKGROUND OF THE INVENTION

This invention relates to an apparatus for measurement of velocity of fluids, in particular to the measurement of wind speed. The invention has particular usefulness in the determination of two orthogonal components of the mean velocity of wind in limits between 5 cm/sec and 50 m/sec.

Techniques involving the use of a drag sphere have previously been employed for measurement both in air and water. However, these systems proved to be insufficiently sensitive in the low range of wind velocities where the dynamic force is relatively low due to the square root relation between the wind force and the wind velocity.

Furthermore, the instruments were not usable in the wide range of environmental conditions encountered in meteorological stations. Furthermore, these instruments were not easily de-iceable.

SUMMARY OF THE INVENTION

It is an object of this invention to provide an improved, more sensitive sensor for the measurement of two orthogonal wind speeds or of wind speed and its direction.

A further object of this invention is to provide a sensor with a small surface exposed to ice deposition capable of being de-iced with a low power expense.

It is a still further object of this invention to provide a drag sphere sensor with an output proportional more closely to wind speed rather than to the wind force.

It is a still further object of this invention to provide a force-balance anemometer utilizing a null principle in which the wind force is opposed by a internally generated force of electromagnetic actuator, so that the measuring shaft will be motionless, no elastic element will be employed as in many other force-measuring devices and hysteresis or temperature offset would tend not to originate from such an elastic element.

It is a still further object of this invention to provide an anemometer with its output available in an electronic form to be transmitted through standard communication channels, or if desired, recorded, displayed or interfaced with a computer.

It is a still further object of this invention to provide an anemometer substantially free of hysteresis and internal friction with a suitable damping usable also in liquids, such as water, by filling the internal volume of the instrument and the neck around the shaft protruding out of the instrument body with a liquid such as silicone oil. The liquid in the neck forms an interface seal due to surface tension preventing water or other undesirable matter from entering the instrument body. Small amounts of the filing fluid that are lost on the interface are, according to the present invention, replenished at the rate of several droplets a day by an oil supply system.

It is a still further object of this invention to provide a compensator of thermal expansion of the liquid located inside the instrument. The compensator is a block of a plastic material which expands with the temperature increase and forms more space inside the instrument for the liquid to expand. The level of liquid in the neck of the instrument body is, therefore, constant and does not fluctuate with ambient temperature changes.

The instrument can also be used without the oil supply system and the compensator of its thermal expansion.

Other objects, features and advantages of the invention will become apparent from the following description of the preferred embodiment of the invention which is illustrated in the accompany drawings.

BRIEF DESCRIPTION OF THE DRAWINGS

FIG. 3 is a perspective view of the oil volume compensator;

FIG. 5 is an exploded view of the means for suspending the shaft of the anemometer; and FIG. 6 is a sectional side elevational view of a portion of the shaft and suspension means.

DESCRIPTION OF THE PREFERRED EMBODIMENT

Figure 1:
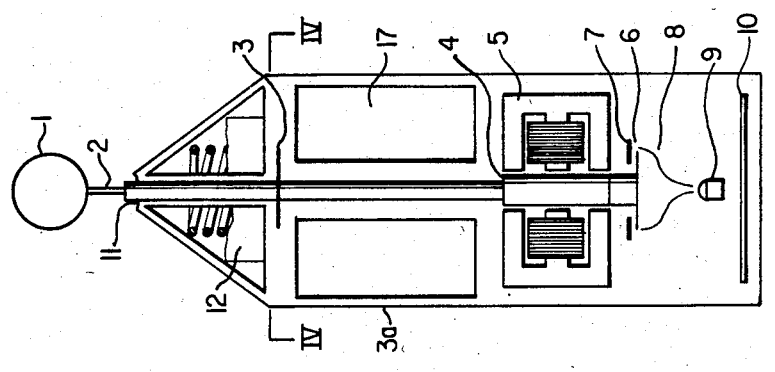
FIG. 1 is a diagrammatic side elevational view of one embodiment of the invention.

Referring to FIG. 1, the anemometer forming the preferred embodiment of the invention has a drag sphere 1 attached to a shaft 2 mounted into the center of an elastic element 3. The elastic element 3 has a shape of a cruciform or a diaphragm supported by the outer edges on the body of the instrument 3a.

A rectangular ferrite block 4 is attached to the lower end of the shaft 2. A four coil system 5 is arranged around the ferrite block 4 to form the electromagnetic actuator, which generates a force proportional to the square of the current flowing through the coil. Only one of each two opposing coils 5 is energized at a time. The coils can be wound on E-cores as shown or on other shapes, such as C-cores.

A rectangular shield 6 is a basic part of the optical sensing means for detecting angular deflection of the shaft 2. The edges of the shield are illuminated by light transmitted through four fiber optic bundles 8 from a single light emitting diode 9. Four photoelectric detectors 7 are located on the opposite side of the shield 6. Each two opposing detectors 7 are connected in an antiparallel manner to provide a signal proportional to the deflection of the shaft from its neutral position. The signal is amplified and brought into the proportional and integral control of the actuator 5 in a sense acting to decrease the shaft deflection back to zero. As a result, the actuator keeps the shaft in its central position, generates a force balancing the wind force in two orthogonal directions, and provides two outputs—proportional to the actuator currents—that are a measure of two orthogonal wind speeds. To eliminate the influence of instrument tilt and linear acceleration, the unit is mechanically balanced. In the free-hand shaft position, the optical position detector must be well centered to provide a zero signal (without electrical offset). This eliminates the error signal due to temperature changes.

The oil level will move up and down as a result of the thermal expansion of the oil. This could change the shaft balance if the instrument were tilted. To minimize this effect, the volume of oil is kept small by potting the coils in an epoxy filler. Also, the annulus between the shafts 2 and oil supply is large to prevent surface tension of the oil from causing moments at the oil/air interface.

Mechanical temperature effects have been minimized by the use of the same material for the cruciform 3 and its support. Optical thermal effects are also minimized by the use of photodiode detectors 7 produced from the same wafer and by their illumination by a single LED 9.

Additional features of the anemometer include a body filled with a liquid such as silicone oil, forming a level in a neck around the shaft at 11, electronics 10, oil supply unit 12 and oil volume compensator 17.

Figure 2:
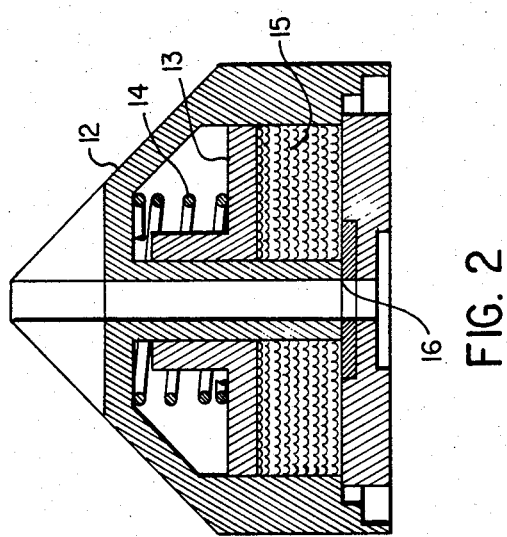
FIG. 2 is a diagrammatic view of an oil supply system.

As shown in FIG. 2, the oil supply system includes a body 12, a piston 13, a spring 14, the oil reserve 15 and one or more small passages 16 leading from the oil supply 15 into the internal cavity of the instrument.

As shown in FIG. 3, an oil volume compensator 17 includes a body 17a having several cavities 18 enclosed by lids 19. Inside each cavity 18 there is a metal block filling most of the space. The cavities 18 are mutually interconnected by passages 20 and the entire compensator can be connected to the instrument internal cavity by connector 21. The function of the compensator is as follows:

The volume of oil in the instrument changes with temperature and, therefore, the oil level in the neck around the shaft would fluctuate. When the oil level is low, there would be a possibility of water getting into the instrument and when the level is high there would be losses of oil flowing out of the neck. In order to keep the level constant, the oil volume changes are exactly matched by volume changes of cavities 18 in plastic body 17. The volume of each of the cavities 18 in the plastic body 17 is chosen in such a way that thermal volume changes are equal to those of the oil in the instrument. To make the compensator more efficient and keep the total volume of oil in the instrument and in the compensator as low as possible, the compensator cavities 18 are filled with metal cylinders.

Figure 4:
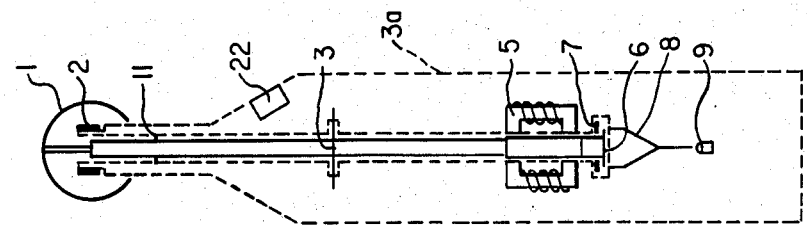
FIG. 4 is a diagrammatic side elevational view of another embodiment of of the invention.

Referring to FIG. 4, showing another embodiment of the invention without the oil supply and temperature compensation system, the anemometer has a de-icing heater not shown located on a body neck protruding inside the drag element 1. The heater is energized by icing sensors 22.

The cruciform 3, shown in FIGS. 5 and 6, is chemically milled from 0.12 mm thick spring steel. This method provides both excellent strength in the vertical and horizontal directions, as well as good sensitivity to the angular shaft motion caused by elastic strain in arms 40. An outer ring 42 prevents an arm from shifting in its mount and thus avoids any buckling of the cruciform 3. Four short arms 46 at 45° allow its attachment as by screws 47 to shaft flanges 48 to prevent any rotation about the vertical axis. The shaft flanges clamp the cruciform 3 just at the center, leaving the entire length of the four arms 40 free for angular motion. The vertical motion of the shaft is limited by a set of stops. Identical rings 50, having recesses 52, are provided above and below the cruciform 3 so as to clamp the outer edge of the cruciform 3. The shaft flanges 48 are received in the recesses 52. The bottom ring 50 is fastened to the instrument body 3a. It will be noted that clearance is provided at 56 to function as a motion stop to prevent overload of the cruciform 3 in a vertical direction.

We claim:

1. An anemometer for measuring the velocity of a fluid, said anemometer comprising a body, a shaft in said body, suspension means for said shaft in the form of a cruciform shaped diaphragm, a sphere on an outer end of said shaft, means for sensing deflection of said shaft, and an electromagnetic actuator for returning said shaft to a neutral position in response to signals from said means for sensing deflection of said shaft, whereby current applied to said electromagnetic actuator is proportional to the velocity of the fluid and can be measured to indicate the velocity of the fluid.

2. An anemometer according to claim 1 wherein a said means for sensing deflection of said shaft is a rectangular shield attached to an end of said shaft, four fiber optic bundles for conducting the light from a single light source to four edges of said shield and four photoelectric detectors for monitoring changes of light flux to detect displacement of said shaft.

3. An anemometer according to claim 1 wherein the entire shaft is exactly balanced around its suspension means to make the instrument insensitive to linear translational acceleration.

4. An anemometer according to claim 1 wherein a body is provided around said anemometer and is filled with a liquid such as silicone oil to prevent air or water from entering the anemometer body.

5. An anemometer according to claim 4 wherein an oil volume compensator is provided to replenish lost oil, said oil is forced through at least one fine orifice.

6. An anemometer as claimed in claim 1 wherein said suspension means comprises a cruciform of spring steel including an integral outer ring, four arms integrally joined to the ring and to each other and four shorter arms between the first mentioned arms connecting said cruciform with a flange on one portion of said shaft and with a similar flange on a second portion of said shaft.

* * * * *